United States Patent
Mu

(10) Patent No.: US 11,867,518 B2
(45) Date of Patent: Jan. 9, 2024

(54) METHOD AND APPARATUS FOR DETERMINING PUBLIC TRANSPORT ROUTE

(71) Applicant: Apollo Intelligent Connectivity (Beijing) Technology Co., Ltd., Beijing (CN)

(72) Inventor: Qing Mu, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 50 days.

(21) Appl. No.: 17/703,865

(22) Filed: Mar. 24, 2022

(65) Prior Publication Data

US 2022/0214175 A1    Jul. 7, 2022

(30) Foreign Application Priority Data

Jun. 29, 2021   (CN) .......................... 202110729822.3

(51) Int. Cl.
*G01C 21/34*   (2006.01)
*G01C 21/00*   (2006.01)
(Continued)

(52) U.S. Cl.
CPC ....... *G01C 21/343* (2013.01); *G01C 21/3423* (2013.01); *G01C 21/3815* (2020.08); *G06Q 50/26* (2013.01); *G06Q 50/30* (2013.01)

(58) Field of Classification Search
CPC .............. G01C 21/343; G01C 21/3815; G01C 21/3423; G06Q 50/26; G06Q 50/30
See application file for complete search history.

(56) References Cited

U.S. PATENT DOCUMENTS 8,688,532 B2 *   4/2014   Khunger .............. G06Q 10/047
                                                        705/26.1
9,562,785 B1 *   2/2017   Racah .............. G06Q 10/06315
(Continued)

FOREIGN PATENT DOCUMENTS

CN   103942948 A   7/2014
CN   105023426 A   11/2015
(Continued)

OTHER PUBLICATIONS

First Office Action of the parallel application JP2022-023348.
(Continued)

*Primary Examiner* — Gertrude Arthur Jeanglaude
(74) *Attorney, Agent, or Firm* — J.C. PATENTS

(57) ABSTRACT

A method and an apparatus for determining a public transport route, where the method includes: obtaining a request for route planning; identifying a plurality of road segments included in a first area in a map, and acquiring an identifier of an existing public transport vehicle corresponding to each road segment; determining a first route among the plurality of road segments based on the identifier of the existing public transport vehicle corresponding to each road segment; determining a plurality of stopping locations in the first route, generating a target public transport route based on the first route and the plurality of stopping locations, and outputting the target public transport route.

20 Claims, 8 Drawing Sheets

(51) Int. Cl.
  *G06Q 50/26* (2012.01)
  *G06Q 50/30* (2012.01)

(56) References Cited

U.S. PATENT DOCUMENTS

| | | | | |
|---|---|---|---|---|
| 2007/0138347 | A1* | 6/2007 | Ehlers | G01C 21/34 |
| | | | | 246/1 R |
| 2010/0299177 | A1* | 11/2010 | Buczkowski | G06Q 10/06311 |
| | | | | 705/7.13 |
| 2017/0109764 | A1* | 4/2017 | Tripathi | G06Q 30/0202 |
| 2018/0143027 | A1* | 5/2018 | Schlesinger | G01C 21/343 |
| 2019/0316920 | A1 | 10/2019 | Miyagawa | |

FOREIGN PATENT DOCUMENTS

| | | |
|---|---|---|
| CN | 105468595 A | 4/2016 |
| CN | 105808877 A | 7/2016 |
| CN | 106651034 A | 5/2017 |
| CN | 107167151 A | 9/2017 |
| CN | 107194128 A | 9/2017 |
| CN | 108647910 A | 10/2018 |
| CN | 108805356 A | 11/2018 |
| CN | 108831149 A | 11/2018 |
| CN | 109493601 A | 3/2019 |
| CN | 109902878 A | 6/2019 |
| CN | 110490381 A | 11/2019 |
| CN | 110598930 A | 12/2019 |
| CN | 110598942 A | 12/2019 |
| CN | 110929910 A | 3/2020 |
| CN | 111897868 A | 11/2020 |
| CN | 112419704 A | 2/2021 |
| CN | 112700073 A | 4/2021 |
| CN | 112906981 A | 6/2021 |
| JP | 2011164889 A | 8/2011 |

OTHER PUBLICATIONS

"Guide for introducing community bus (principal text)", Japan, Matudo City Office, Jul. 31, 2020, https://www.city.matsudo.chiba.jp/kurashi/douro/bus_noriba-jikoku/kotu_kaigi/tebiki.files/original_version.pdf.

"Research on Basic Problems of BRT Planning", by Aiping Chen, Master Degree Thesis, Changan University, Jan. 1, 2004.

"Research on Coordination Theory of the Planning of Comprehensive Transport Hub", by Yiming Qi, Doctoral Dissertation, Southwest Jiaptong University, Classified Index: U115, Z1, Sep. 27, 2010.

Extended European Search Report of the parallel application EP22164735.7.

NPL1: "Customizing Your Own Route with QQIP. A Quantitative and Qualitative Itinerary Planner for New Transportation Routes", Proceedings of the 28th ACM Joint Meeting on European Software Engineering Conference and Symposium on the Foundations of software Engineering, ACM New York, NY, USA, Apr. 20, 2020, pp. 230-234.

NPL2: "Evaluation and optimization of bus route network in Wuhan China", 7th Advanced Forum on Transportation of China (AFTC 2011), Jan. 1, 2011, pp. 140-148.

First Office Action of the priority application CN202110729822.3.

* cited by examiner

METHOD AND APPARATUS FOR DETERMINING PUBLIC TRANSPORT ROUTE

CROSS-REFERENCE TO RELATED APPLICATION

The present application claims priority to Chinese Patent Application No. 202110729822.3, filed on Jun. 29, 2021, which is hereby incorporated by reference in its entirety.

TECHNICAL FIELD

The present disclosure relates to the field of intelligent transportation in data processing technologies and, in particular, to a method and an apparatus for determining a public transport route.

BACKGROUND

With the continuous development of road traffic, public transport occupies an increasingly important position in road traffic.

At present, when determining a public transport route, the traffic department usually develops a corresponding public transport route based on the empirical information from previous planning of road traffic.

SUMMARY

The present disclosure provides a method and an apparatus for determining a public transport route.

According to a first aspect of the present disclosure, there is provided a method for determining a public transport route, including:

acquiring a route planning request, where the route planning request is used to request for planning a public transport route within a first area;

identifying a plurality of road segments included within the first area in a map and obtaining an identifier of an existing public transport vehicle corresponding to each road segment in a preset database;

determining a first route among the plurality of road segments based on the identifier of the existing public transport vehicle corresponding to each road segment, where the first route includes at least one road segment, there is no identical public transport vehicle in the at least one road segment, or the number of an existing public transport vehicle corresponding to some of the road segments in the first route is smaller than or equal to a first threshold value; and determining a plurality of stopping locations in the first route, generating a target public transport route based on the first route and the plurality of stopping locations, and outputting the target public transport route.

According to a second aspect of the present disclosure, there is provided an apparatus for determining a public transport route, including:

at least one processor; and a memory connected in communication with the at least one processor; where the memory stores instructions that are executable by the at least one processor, where the instructions are executed by the at least one processor to enable the at least one processor to perform the method described in the first aspect.

According to a third aspect of the present disclosure, there is provided a non-transitory computer-readable storage medium having computer instructions stored therein, where the computer instructions are used to enable a computer to perform the method described in the first aspect.

It should be understood that the description in this section is not intended to identify key or important features of embodiments of the present disclosure, nor is it intended to limit the scope of the present disclosure. Other features of the present disclosure may be understood easily by the following description.

BRIEF DESCRIPTION OF DRAWINGS

The accompanying drawings are used for a better understanding of the present solutions and do not constitute a limitation of the present disclosure. Among them.

DESCRIPTION OF EMBODIMENTS

Figure 1:
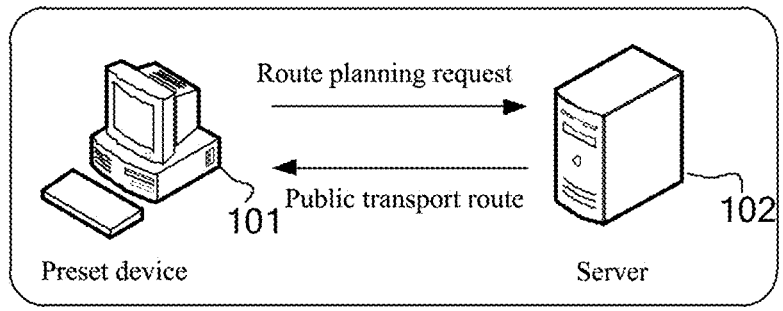
FIG. 1 is a schematic diagram of a system for determining a public transport route according to an embodiment of the present disclosure.

Hereafter, exemplary embodiments of the present disclosure will be described combined with the accompanying drawings, in which various details of embodiments of the present disclosure are included to aid in understanding, and which should be considered merely exemplary. Accordingly, those skilled in the art should recognize that various changes and modifications may be made to the embodiments described herein without departing from the scope and spirit of the present disclosure. Similarly, for the sake of clarity and brevity, descriptions of well-known functions and structures are omitted from the following description.

In order to better understand the technical solutions of the present disclosure, the related technology covered by the present disclosure will be described as following.

Public transport, also known as mass transit, refers broadly to all modes of transportation that are open to the general public and provide transport services, usually as a commercial service for a fee, although there are a few exceptions where it is free.

Public transport systems consist of physical elements such as roads, traffic transportation, and station facilities. In a broad sense, public transport includes civil aviation, railroads, highways, waterways and other transport modes; and in a narrow sense, public transport refers to buses and railways, ferries, ropeways, and other transport modes operating on fixed lines within a city, where public transport means may include, for example, public transport vehicles, subways, light railways, buses, ferry buses, and so on.

In various cities, choosing public transport for travel is a convenient and economical way for travel, and compared to other modes of travel, using public transport for travel is greener and more environmentally friendly as it helps to reduce traffic congestion, fuel consumption, travel costs, and exhaust emissions. Therefore, for the sustainable development of cities, people are encouraged to choose public transport for travel as much as possible, and thus the rationality and comprehensive coverage of the public transport routes are crucial.

Where depending on specific segments they include, the public transport routes may include, for example, the following types of routes: express line, trunk line, branch line, and microcirculation. The types of routes and application scenarios of the public transport are described below.

First, the express line is defined as large-stop expresses throughout an entire or partial segment of the trunk line, and it is characterized by a small number of stops on the entire or partial segment, saving time and increasing efficiency. A vehicle type of a public transport vehicle for a general express line includes at least one of the following: 12 m, 13.9m, 14 m, 15 m, 16 m, and 18 m. When choosing a fuel of the public transport vehicle for the express line, it is inadvisable to choose purely electric vehicles because of the long route, and it is advisable to choose diesel or oil-electric hybrid. A mileage of the public transport vehicle for the express line is usually between 20 km and 180 km. A group of people for the express line is those with long distance needs and commuting needs from urban district to satellite town.

As well, the trunk line is defined as a route on a main road, and it is characterized as a public transport route structured on the main road. A vehicle type of a public transport vehicle for the trunk line generally includes at least one of the following: 12 m, 13.9 m, 14 m, 15 m, 16 m, and 18 m. A fuel of the public transport vehicle for the trunk line may be: diesel, pure electric, or oil-electric hybrid. A mileage of the public transport vehicle for the trunk line is usually between 10 km and 30 km. A group of people of the trunk line is those with commuting needs within urban district and from urban district to satellite town.

As well, the branch line is defined as a branch route around a trunk line, and it is characterized as a local route that is auxiliary to the main trunk line network and radiates to surrounding branches. A vehicle types of a public transport vehicle for the branch line generally includes at least one of the following: 10 m, 11 m, 12 m, 13.9 m, 14 m, 15 m, 16 m, and 18 m. When choosing a fuel of a public transport vehicle for the branch line, diesel, pure electric, or oil-electric hybrid may be chosen. A mileage of a vehicle for the branch line is usually between 8 km and 20 km. A group of people for the branch line is those with commuting needs in local area, with connection needs from local area to trunk line and with interchange needs of subways.

As well, the microcirculation is defined as a connection point route with regional nature, mostly found near communities or parks. It is characterized by the ability to connect points within the communities or parks to nearby subway stations, hubs, or trunk lines, while taking into account the needs within the communities/parks. A vehicle type of public transport vehicles for the microcirculation generally includes at least one of the following: 6 m, 7 m, 8 m, 9 m, 10 m, 11 m, and 12 m. When choosing a fuel of a public transport vehicle for the microcirculation, diesel, pure electric, or oil-electric hybrid may be chosen. A mileage of a vehicle for the microcirculation is usually between 1 km and 10 km. A group of people for the microcirculation is those with connection needs from the communities or parks to the nearby subway stations or hubs or trunk lines, as well as with medical, shopping, and door-to-door needs within the communities or parks.

The types of public transport routes have been described above. At present, when determining a public transport route in related technologies, it is usually that the transport department develops a corresponding public transport route based on the empirical information from previous planning of road traffic; however, the determination of the public transport route based only on human empirical information may lead to the determination of the public transport route by considering only a very small amount of information, thereby resulting in incomprehensive coverage of public transport.

In view of the problem in the prior art, the present disclosure proposes the following technical idea: for an area where planning for a public transport route is required, road information, location information, traffic information, etc. in the area are automatically acquired, and then processed to obtain a public transport route, so that automatic generation of the public transport route may be achieved; and since the process of determining the route comprehensively relies on information from various aspects and the areas that are not covered by the public transport are determined preferentially, the comprehensive coverage of the determined public transport route is ensured.

The method for determining a public transport route provided by the present disclosure is described below in connection with a specific embodiment. Firstly, a system of the method for determining a public transport route provided by the present disclosure is illustrated in combination with FIG. 1, which is a schematic diagram of the system of determining a public transport route provided by an embodiment of the present disclosure.

As shown in FIG. 1, the system includes a preset device 101 and a server 102.

Where the preset device 101 may send a route planning request to the server 102, and the route planning request is used to request a determination of a public transport route at a specified location.

After receiving the route planning request, the server 102 may acquire relevant information for route determination, thereby generating a public transport route, after which the generated public transport route may, for example, be sent to the preset device.

In the present embodiment, the preset device may be understood to be, for example, a terminal device, where the terminal device may be, for example, a computer device, a tablet computer, or a mobile phone (or known as "cellular" phone), etc. The terminal device may also be a portable, pocket-sized, handheld, computer-built-in mobile apparatus or device, and is not particularly limited herein.

Referring to FIG. 1, it may be determined that the preset device 101 and the server 102 in the present embodiment may conduct an interaction, where the interaction may be, for example, in a manner of a wired network, which may include, for example, coaxial cable, twisted pair, and optical fiber, etc., and where the interaction may also be, for example, in a manner of a wireless network, which may be a 2G network, a 3G network, a 4G network, a 5G network, or a wireless fidelity (WIFI) network, etc.

Embodiments of the present disclosure do not limit the specific type or specific form of the interaction, as long as it may achieve the function of the interaction between the server and the preset device.

On the basis of the above introduced contents, the method for determining the public transport route provided by the present disclosure will be described below in combination with specific embodiments, and it should be noted that an executive entity of each embodiment of the present disclosure may be the above-introduced server. In an actual implementation, a processor, a microprocessor, etc. may act as the executive entity of each embodiment of the present disclosure in addition to the above-introduced server, and the present embodiments have no limit in this regard, any device can be used as the executive entity of the present embodiment, as long as it has the function of data sending and receiving, and data processing.

Figure 2:
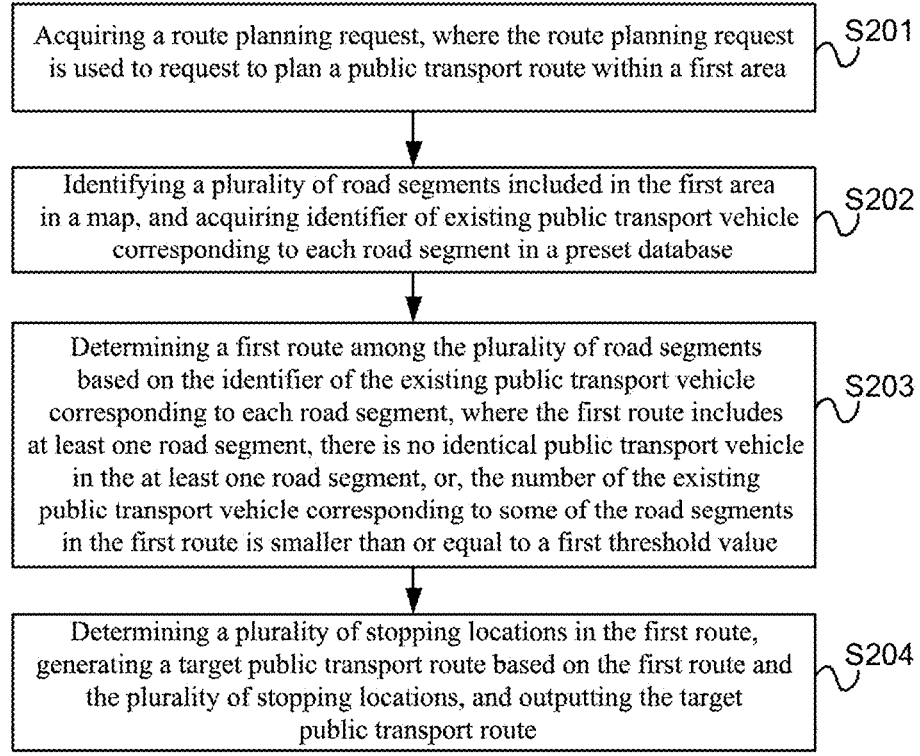
FIG. 2 is a flowchart of a method for determining a public transport route according to an embodiment of the present disclosure.
Figure 3:
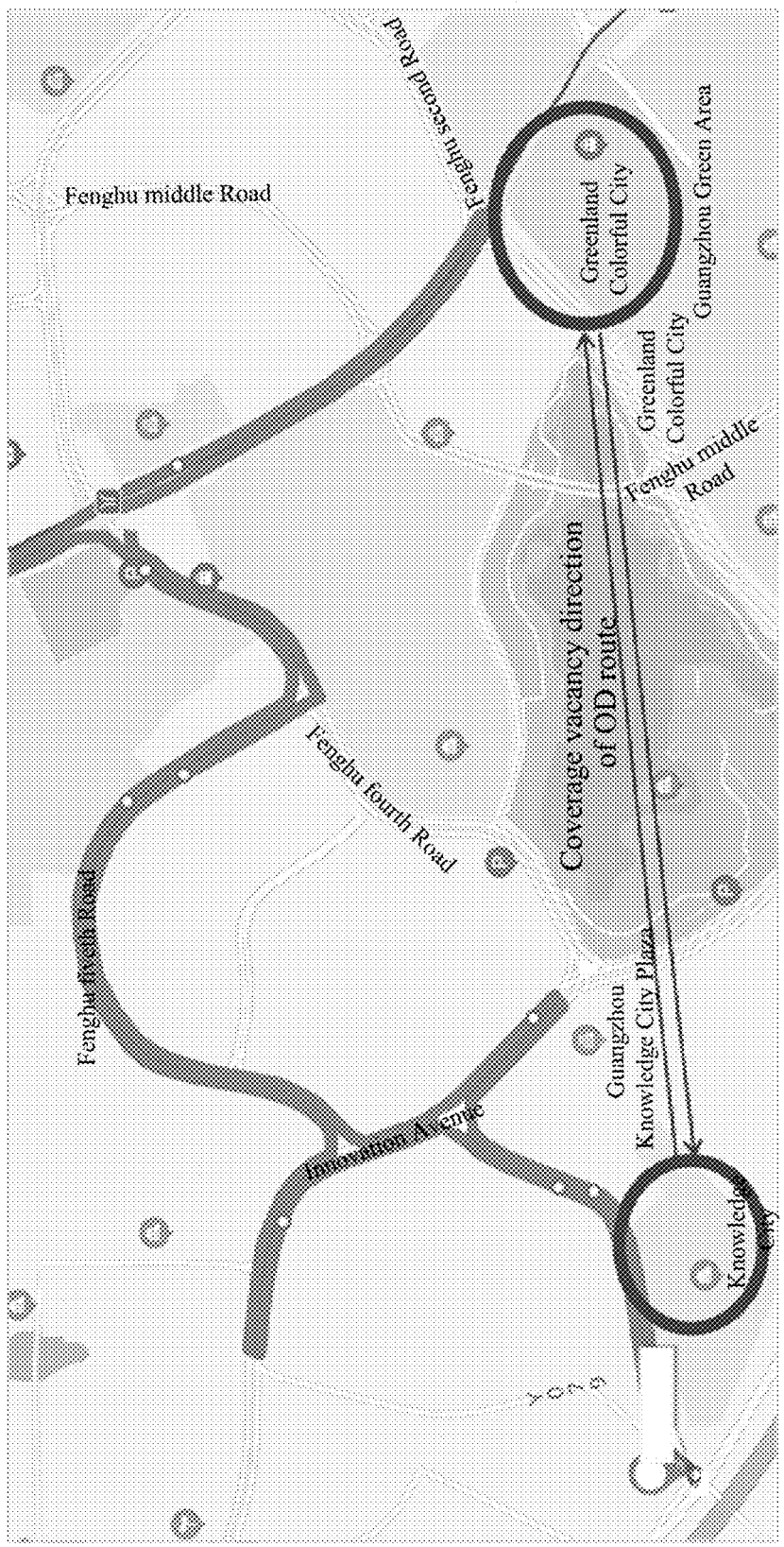
FIG. 3 is a schematic diagram of a situation where there is no public transport according to an embodiment of the present application.

Firstly, the method for determining a public transport route provided by an embodiment of the present disclosure is described in combination with FIG. 2 and FIG. 3, where FIG. 2 is a flowchart of the method for determining a public transport route provided by the embodiment of the present disclosure, and FIG. 3 is a schematic diagram of a situation where public transport is not present provided by the embodiment of the present disclosure.

As shown in FIG. 2, the method includes:

S201: acquiring a route planning request, where the route planning request is used to request to plan a public transport route within a first area.

In the present embodiment, acquiring a route planning request may be implemented, for example, by receiving a route planning request from a preset device, where the route planning request is used to request to plan a public transport route within the first area.

Where the first area is an area in which the public transport route planning is to be carried out, and in a possible implementation, the route planning request may include, for example, at least one location for indicating the planning of the public transport route in the vicinity of the location, then the first area therein may, for example, be a location within a preset range of the at least one location.

For example, the route planning request may currently include a location A, which may, for example, be a subway station, then based on a preset radius, it is possible to, for example, determine an area within the preset radius with a position of the location A as a center of a circle, so as to obtain the first area, followed by carrying out the planning of the public transport route in the first area.

Alternatively, the route planning request may directly include the first area, where the first area may, for example, be a rectangle, then the route planning request may, for example, include latitude and longitude information of four corners of the rectangle, so that the first area may be effectively determined; and in an actual implementation, a specific implementation of the first area may be selected based on actual needs. It may, for example, also be polygonal, circular, elliptical, irregular shape and so on, and is not particularly limited in the present embodiment.

S202: identifying a plurality of road segments included in the first area in a map, and acquiring identifier of existing public transport vehicle corresponding to each road segment in a preset database.

In the present embodiment, it is necessary to refer to information from various aspects when planning a public transport route, and relevant information within the first area may be, for example, acquired in the map.

In a possible implementation, for example, a plurality of road segments included in the first area may be identified in the map, and herein division of the road segments may be determined, for example, based on division of the actual road segments, for example, the first area may include xx first road, xx second road, xx third road, and so on; since the information of each road segment is included in the map, the plurality of road segments included in the first area may be directly identified in the map.

Optional, when determining the road segments included in the first area, the road segments may also be filtered based on width, height, traffic restriction, road order, and other information of the road segments, so that the road segments included in the determined first area may ensure normal passage of public transport means, for example, some alleys may be included in the first area, but buses cannot pass through the alleys, thus this part of road segments may be screened out when determining the road segments included in the first area; that is, the plurality of road segments included in the first area currently identified in the map all satisfy a preset condition, where the preset condition includes, for example, at least one of the following: width of the road segments is greater than a preset width, height restriction of the road segments is greater than a preset height, and so on.

Also, in the present embodiment, when acquiring the information about the first area, the identifier of the existing public transport vehicle corresponding to each road segment may be acquired from the preset database.

Where the preset database may, for example, store all the road segments in the map and the identifier of the existing public transport vehicle corresponding to each road segment, and thus the identifier of the existing public transport vehicle corresponding to each road segment among the plurality of road segments included in the first area currently determined may be acquired from the preset database. Where the identifiers of the public transport vehicles may be, for example, numbers of the public transport vehicles, and so on, for example, No. x bus, No. x subway, etc.

In this regard, for example, it may be illustrated with a specific example, assuming that the first area currently determined includes three road segments, Yinghua first road, Yinghua second road, and Yinghua third road, respectively, and then respectively acquiring the identifiers of existing public transport vehicles corresponding to these three road segments in the preset database.

For example, there is No. 311 bus, No. 260 bus and No. 400 bus on Yinghua first road, No. 6 bus and No. 400 bus on Yinghua second road, No. 190 bus and No. 29 bus on Yinghua third road, etc.

In an actual implementation, both the road segments included in the first area specifically determined, and the identifiers of existing public transport vehicles corresponding to respective road segments included in the first area may be selected based on the actual needs, and is not limited in the present embodiment.

S203: determining a first route among the plurality of road segments based on the identifier of the existing public transport vehicle corresponding to each road segment, where the first route includes at least one road segment, there is no identical public transport vehicle in the at least one road segment, or, the number of the existing public transport vehicle corresponding to some of the road segments in the first route is smaller than or equal to a first threshold value.

After determining the identifier of the existing public transport vehicle corresponding to each road segment, it is possible to determine the first road segment, and it is understood that planning of the public transport route within the first area is needed currently, and thus, it is necessary to determine the first road segment among the plurality of road segments included in the first area currently determined.

At the same time, the purpose of setting up a public transport route is to facilitate travel, and then the public transport route needs to cover as large an area as possible, and thus when planning a new route, it is necessary to plan preferentially the route that is not covered by public transport.

Thus, in an possible implementation, when determining a first route among a plurality of road segments, the first route includes at least one road segment among the plurality of road segments, there is no identical public transport vehicle in the at least one road segment, which may be commonly understood to mean that there is no through public transport route on the first route.

Alternatively, in at least one road segment included in the first route, the number of the existing public transport vehicle corresponding to some of the road segments is smaller than or equal to the first threshold value, which may be commonly understood to mean that there is less public transport vehicles on the some of the road segments, where a specific setting of the first threshold value may be selected based on an actual need, and is not limited in the present embodiment.

For example, this may be understood in combination with FIG. 3. As shown in FIG. 3, between the Knowledge City and the Greenland Colorful City is a coverage vacancy direction of OD (Origin and Destination) route in the scenario shown in FIG. 3, where the OD route may be understood as a through route, then for example, the first route may be determined preferentially for the road segment between the Knowledge City and the Greenland Colorful City.

Therefore, in the present embodiment, when determining the first route among the plurality of road segments included within the first area, it is possible to determine preferentially a road segment with less public transport coverage or determine preferentially a road segment with inconvenient public transport; and in an actual implementation, the first route may be determined based on other preset condition in addition to the currently introduced implementations, as long as the first route includes at least one road segment within the first area, and the determination of the first route may increases the coverage and convenience of public transport.

S204: determining a plurality of stopping locations in the first route, generating a target public transport route based on the first route and the plurality of stopping locations, and outputting the target public transport route.

After determining the first route, the determination of the overall road of the public transport has been achieved, and it is understood that for the public transport, stops on the route need to be determined in addition to the need of determining the route, where the stops are stopping locations of the public transport means, and thus the stopping locations need to be determined in the first route.

In a possible implementation, a plurality of stopping locations may be determined in the first route, for example, based on a type of a route to be planned, where the type of the route to be planned may be, for example, a bus, a shuttle bus, a ferry bus, etc., and is not limited in the present embodiment, and specially depends on which type of public transport route currently needs to be planned in the first area, and in an possible implementation, the type of the route to be planned may for example be included in the route planning request.

For example, if the type of the route to be planned is a bus, then, a bus stop already existing in the current first route may be, for example, selected for reuse, so as to determine a plurality of stopping locations; or, for example, if the type of the route to be planned is a ferry bus, then a non-bus stop such as a community or a school in the first area may be determined as a stopping location. Implementation of determining the stopping locations is not limited in the present embodiment, as long as the stopping location is located on the first route and is determined based on the type of the route to be planned.

After determining the first route and the plurality of stopping locations on the first route, a target public transport route may be generated, where the target public transport route includes the first route and the plurality of stopping locations in the first route.

After determining the target public transport route, the target public transport route may be output, and in a possible implementation, for example, the target public transport route may be sent to the preset device.

The method for determining a public transport route provided by the embodiment of the present disclosure includes: acquiring a route planning request, where the route planning request is used to request for planning a public transport route within a first area; identifying a plurality of road segments included within the first area in a map, and acquiring identifier of existing public transport vehicle corresponding to each road segment in a preset database; determining a first route among the plurality of road segments based on the identifier of the existing public transport vehicle corresponding to each road segment, where the first route includes at least one road segment, there is no identical public transport vehicle in the at least one road segment, or the number of the existing public transport vehicle corresponding to some of the road segments in the first route is smaller than or equal to a first threshold value; determining a plurality of stopping locations in the first route, generating a target public transport route based on the first route and the plurality of stopping locations, and outputting the target public transport route. By determining a plurality of road segments within the first area to be planed for a public transport route as well as the identifier of existing public transport vehicle corresponding to each road segment, then the public transport route is determined comprehensively based on information about this part of road and traffic information; and in this process, the public transport route is determined by combining complete road information and traffic information in the first area and the part not covered by public transport is determined preferentially, so that comprehensive coverage of the determined public transport route is improved effectively.

Figure 4:
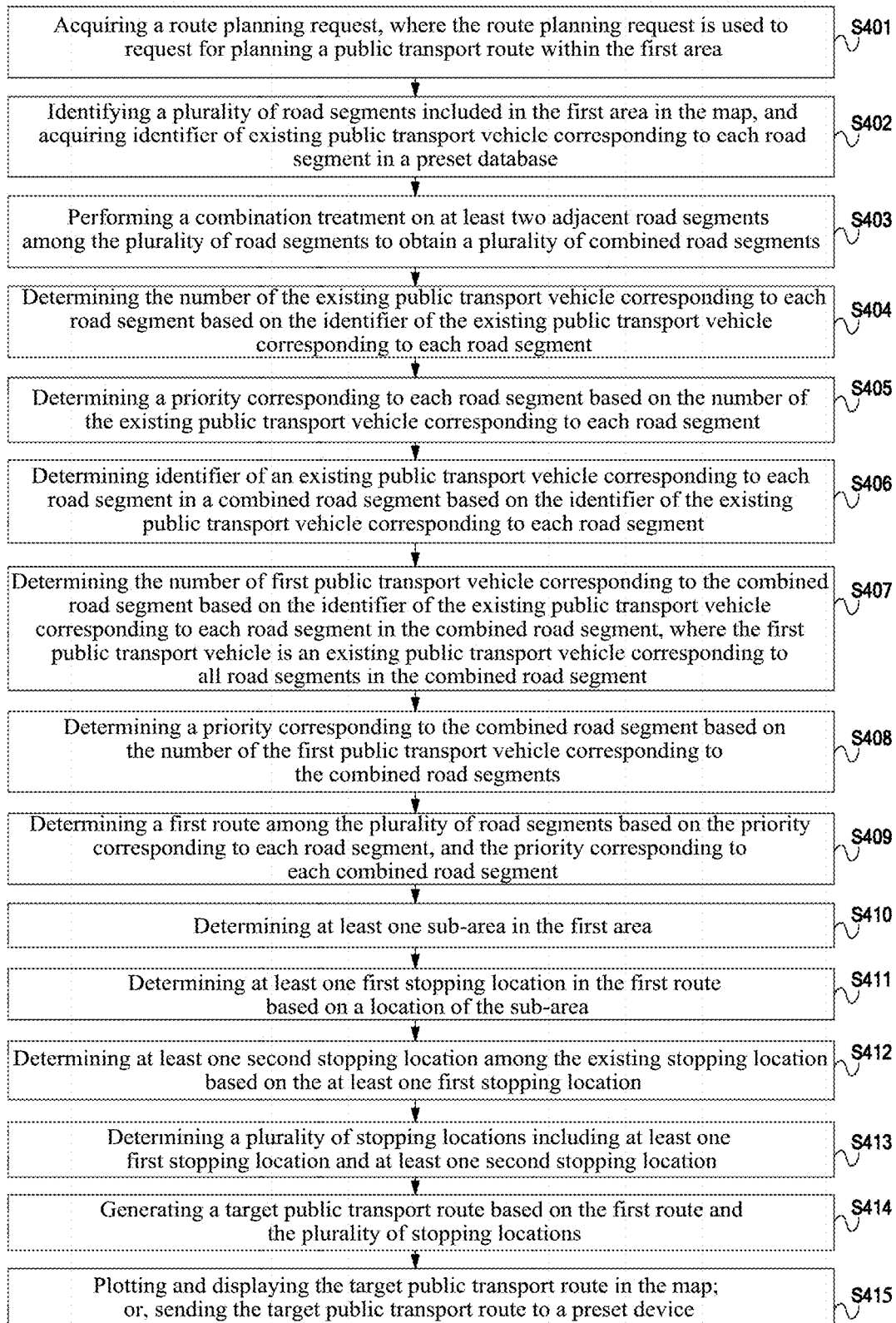
FIG. 4 is a flowchart II of a method for determining a public transport route according to an embodiment of the present disclosure.
Figure 5:
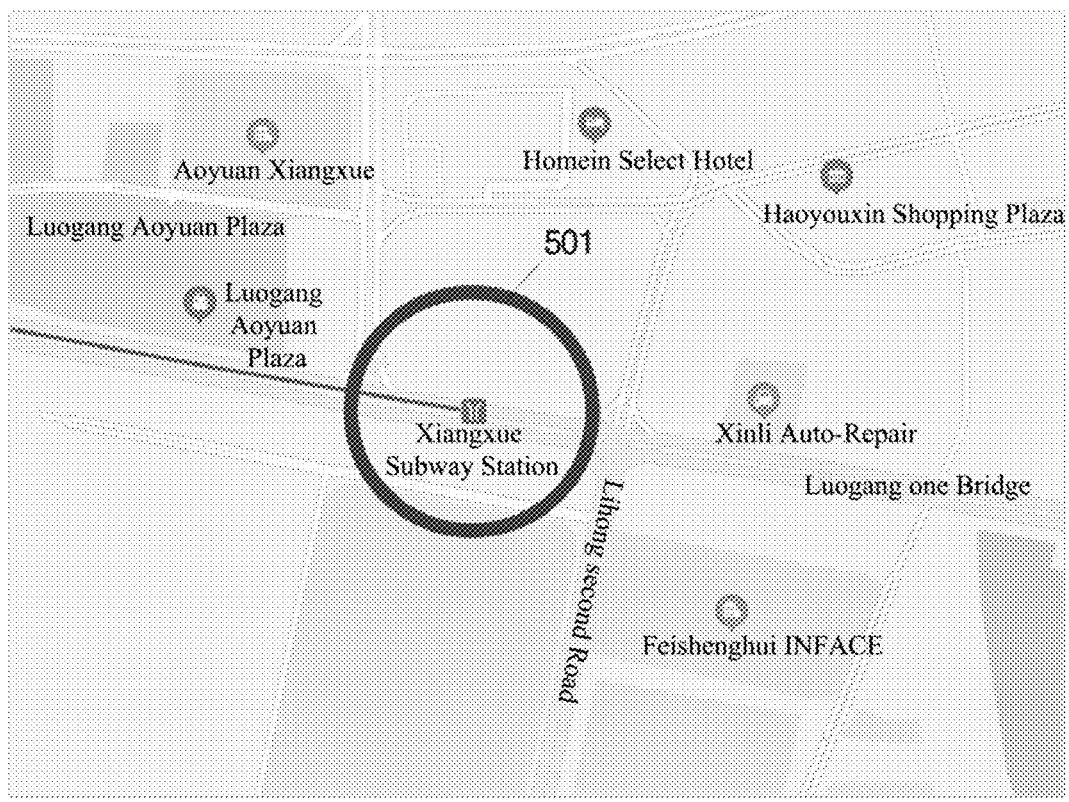
FIG. 5 is a schematic diagram of a location of a public transport route to be planned according to an embodiment of the present disclosure.
Figure 6:
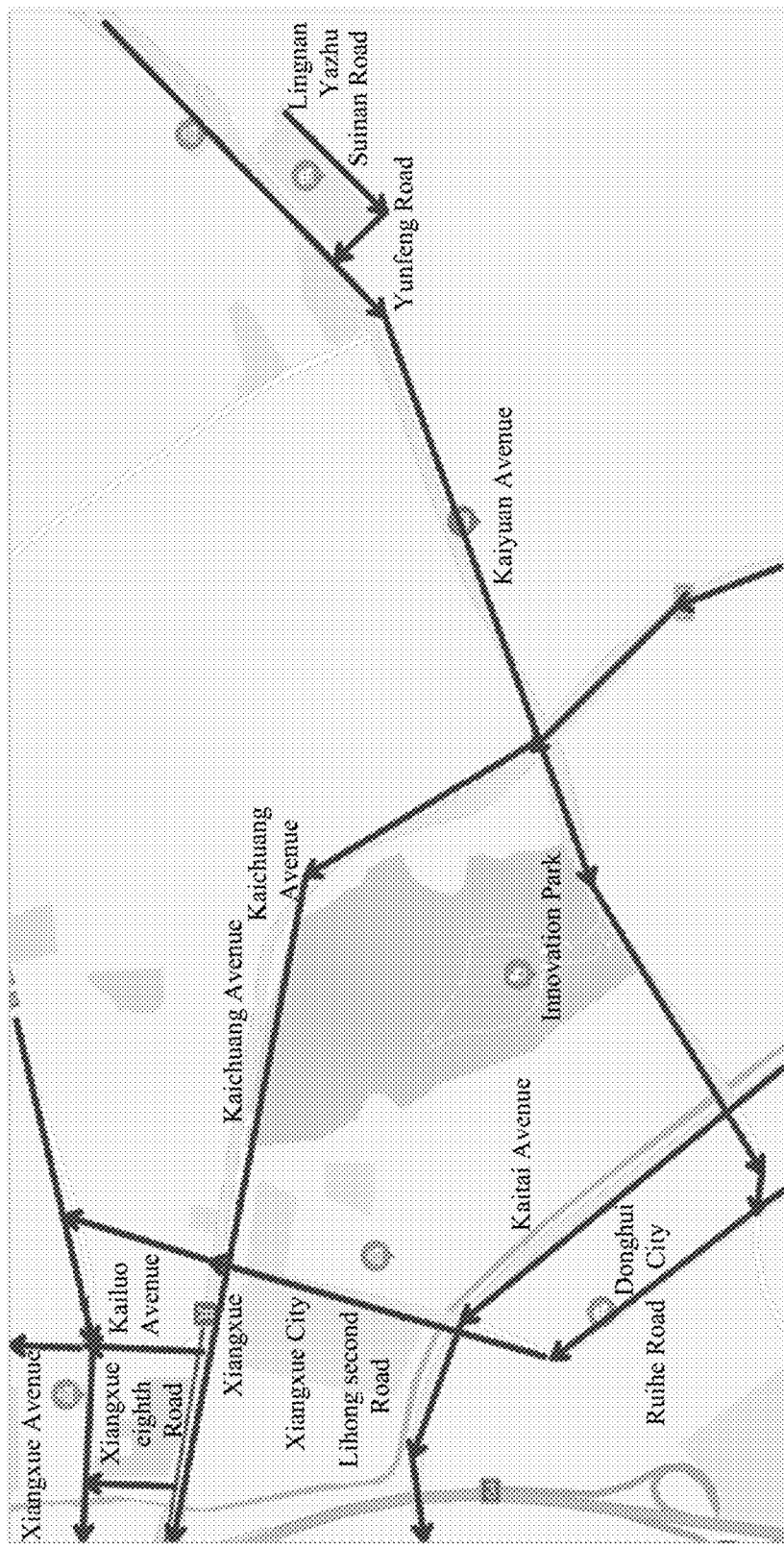
FIG. 6 is a schematic diagram of road segments included in a first area according to an embodiment of the present disclosure.
Figure 7:
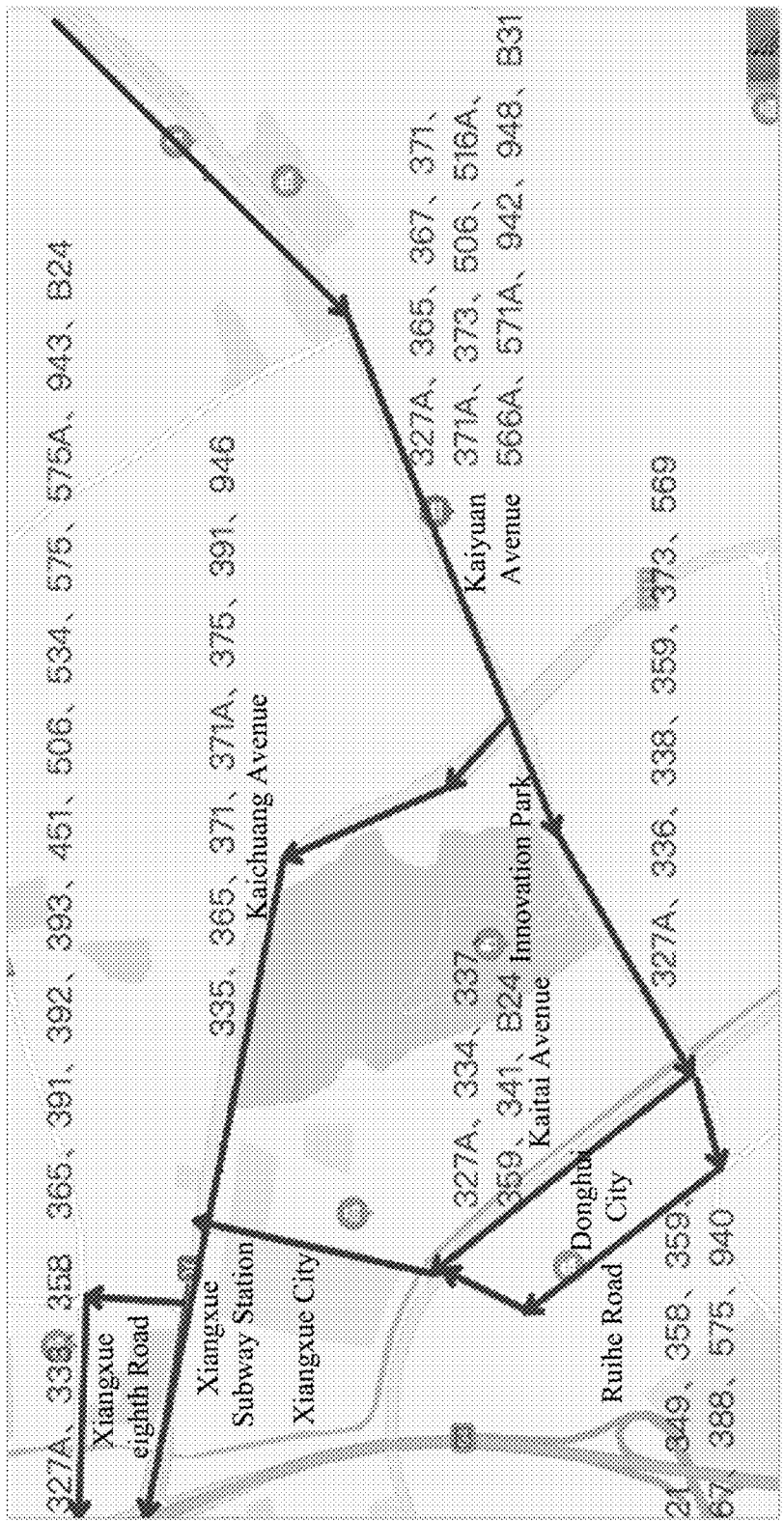
FIG. 7 is a schematic diagram of existing public transport vehicles corresponding to a plurality of road segments according to an embodiment of the present disclosure.
Figure 8:
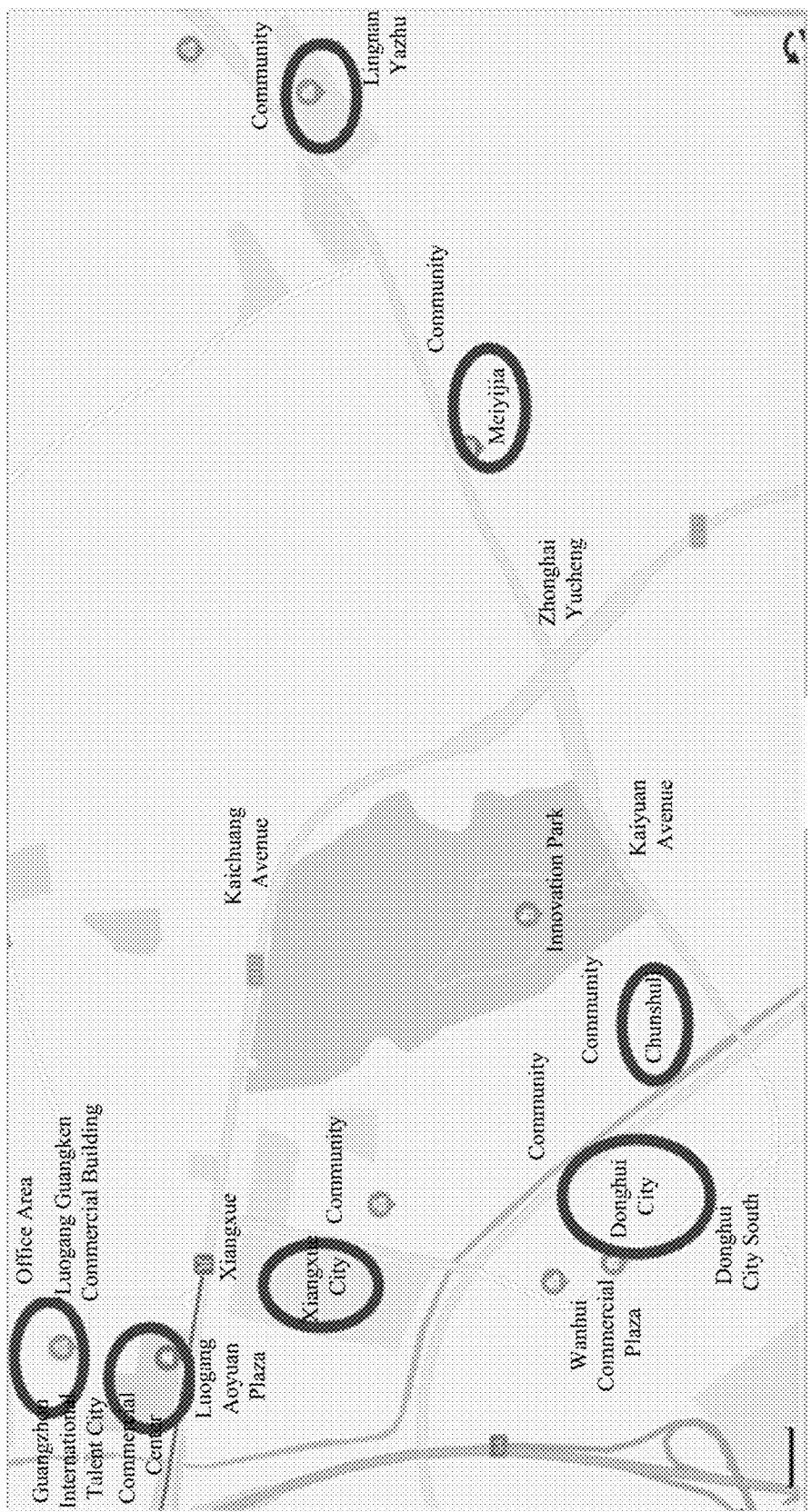
FIG. 8 is a schematic diagram of at least one sub-area according to an embodiment of the present disclosure.

Based on the above embodiment, the method for determining the public transport route provided by the present disclosure is described in further detail below in combination with FIGS. 4 to 8. FIG. 4 is a flowchart II of a method for determining a public transport route according to an embodiment of the present disclosure, FIG. 5 is a schematic diagram of a location of a public transport route to be planned according to an embodiment of the present disclosure, FIG. 6 is a schematic diagram of road segments included in a first area according to an embodiment of the present disclosure, FIG. 7 is a schematic diagram of existing public transport vehicles corresponding to a plurality of road segments according to an embodiment of the present disclosure, and FIG. 8 is a schematic diagram of at least one sub-area according to an embodiment of the present disclosure.

As shown in FIG. 4, the method includes:

S401: acquiring a route planning request, where the route planning request is used to request for planning a public transport route within the first area.

Where S401 is implemented in a similar manner to the implementation described above for S201.

For example, the first area may be understood in combination with FIG. 5. As shown in FIG. 5, assuming that there is currently a need to plan a public transport route for a branch bus to the Xiangxue subway station indicated by 501 in FIG. 5, then the first area corresponding to the Xiangxue subway station may be determined, for example.

In a possible implementation, for example, an area with the Xiangxue subway station as a center and a preset length as a radius may be determined as the first are, and the planning of the public transport route may be carried out within this first area thereafter. It is also possible to determine an area with the Xiangxue subway station as the center and within a preset length and a preset width and thus determine the area as the first area. The present embodiment does not limit a specific implementation of determining the first area. The first area may be an area near a target location in question currently, or may also be an area jointly determined by a plurality of target locations, or may also be a preset area, etc., and is not limited in the present embodiment.

S402: identifying a plurality of road segments included in the first area in the map, and acquiring identifier of existing public transport vehicle corresponding to each road segment in a preset database.

Where S402 is implemented in a similar manner as the implementation of S202, and implementations of determining the route and of the identifiers of the public transport vehicles are each described below in combination with FIG. 6 and FIG. 7.

As shown in FIG. 6, assuming that the above example continues to be used, a plurality of road segments included in the first area corresponding to the Xiangxue subway station may be currently identified in the map, and may include, for example: Xiangxue Avenue, Xiangxue eighth Road, Kailuo Avenue, Kaichuang Avenue, Lihong second Road, Kaitai Avenue, Ruihe Road, Kaiyuan Avenue, Yunfeng Road, and Suinan Road, as shown in FIG. 6.

As well, the identifier of the existing public transport vehicle corresponding to each road segment are stored in the preset database, then the identifier of the existing public transport vehicle corresponding to each road segment in FIG. 6 may be acquired.

Assuming that the current public transport vehicle is a bus and the identifiers of the public transport vehicle is a bus number, the identifiers of the existing public transport vehicle corresponding to each road segment may be understood, for example, in combination with FIG. 7; assuming that the above example continues to be used, for example, the identifiers of the existing public transport vehicle corresponding to the Kaichuang Avenue includes the following: 335, 365, 371, 371A, 375, 391, and 946 as shown in FIG. 7. The identifiers of existing public transport vehicles corresponding to other road segments may refer to FIG. 7 and will not be repeatedly described here.

Based on FIG. 6 and FIG. 7, it may be determined that, after determining the first area, it is possible to determine the road information included in the first area, i.e., the plurality of road segments within the scope of the first area, and also to determine the traffic information included in the first area, i.e., the identifiers of the public transport vehicles corresponding to the plurality of road segments respectively in the first area.

In an actual implementation, the plurality of road segments in the first area and the identifiers of the public transport vehicles corresponding to each road segment respectively may be determined based on an actual road condition and traffic, and is not limited in the present embodiment.

S403: performing a combination treatment on at least two adjacent road segments among the plurality of road segments to obtain a plurality of combined road segments.

A first route may be determined in the plurality of road segments in the present embodiment, where the first route may include at least one road segment, and it is understood that the at least one road segment in the first route may inevitably form a continuous route, so that the determined first route is meaningful.

Therefore in the present embodiment, at least two adjacent road segments among the plurality of road segments may be subjected to a combination treatment firstly, so as to determine a plurality of combined road segments, where the combined road segments may also be understood as units of the first route.

For example, with reference to FIG. 6 for understanding, for example, it is possible to combine the Suinan Road, Yunfeng Road and Kaiyuan Avenue in FIG. 6, so as to obtain a combined road segment; or, it is possible to combine Ruihe Road and Lihong Second Road, so as to obtain a combined road segment. In an actual implementation, specific road segments that will be combined so as to determine a combined road segment may be selected based on an actual need, and is not limited in the present embodiment, and they may be selected based on the actual need, as long as segments of the combined road segment may form a continuous route.

In a possible implementation, various possible combinations of at least two adjacent segments among the plurality of segments may be determined, for example, so as to determine a plurality of combined road segments; alternatively, only some of combinations may be determined, so as to determine a plurality of combined road segments. Specific implementations of the combinations are not limited in the present embodiment, and may be selected based on actual needs.

S404: determining the number of the existing public transport vehicle corresponding to each road segment based on the identifier of the existing public transport vehicle corresponding to each road segment.

It is understood that the wider scope the public transportation covers, the better it is, and the greater the number is, the better it is, and thus in the present embodiment, when determining the public transport route, the road segment with fewer public transport vehicles may be determined preferentially.

Therefore, in the present embodiment, the number of the existing public transport vehicle corresponding to each road segment may be determined based on the identifier of existing public transport vehicle corresponding to each road segment, which can be understand, for example, in combination with FIG. 7, in which the identifier of the existing public transport vehicle corresponding to each road segment is marked, for example, the number of the existing public transport vehicle corresponding to Ruihe Road is 8, the number of the existing public transport vehicle corresponding to Kai Tai Avenue is 6, and the like, other roads are similar thereto, and will not be repeated here.

S405: determining a priority corresponding to each road segment based on the number of the existing public transport vehicle corresponding to each road segment.

After determining the number of the existing public transport vehicle corresponding to each road segment, the priority corresponding to each road segment may be determined. It may be understood that the route determination is performed preferentially on the road segment with a smaller number of public transport vehicles currently, so the number of the existing public transport vehicle on a road segment and the priority of the road segment are actually inversely proportional to each other, that is, the higher the number of the existing public transport vehicle on the road segment, the lower the priority of the road segment, and accordingly, the lower the number of public transport vehicles on the road segment, the higher the priority of the road segment.

In a possible implementation of determining the priority corresponding to the road segment based on the number of the existing public transport vehicles corresponding to the road segment, it may be, for example, that if the number of the existing public transport vehicle corresponding to the road segment is N, the priority corresponding to the road segment is determined to be L-N, where N is an integer greater than or equal to 0, and L is a preset positive integer.

For example, L may be preset to 10, assuming that the number of the existing public transport vehicle corresponding to a current road segment A is 1, then the priority corresponding to the road segment A is 9; and assuming that the number of the existing public transport vehicle corresponding to a current road segment B is 8, then the priority corresponding to the road segment B is 2. It may be seen that the number of the existing public transport vehicle of the road segment A is less than the number of the existing public transport vehicle of the road segment B. Correspondingly, the priority of the road segment A is also higher than that of the road segment B. In an actual implementation, a specific setting of L may be selected based on an actual need, and is not limited in the present embodiment.

In another possible implementation, there may also be provided, for example, a first preset function, where the first preset function may indicate an inverse relationship between the number of the existing public transport vehicle corresponding to a road segment and the priority corresponding to the road segment, for example, the number of the existing public transport vehicle corresponding to the road segment may be input into the first preset function, so as to obtain the priority corresponding to the road segment output by the first preset function. The present embodiment does not limit the specific implementation of the determined priority corresponding to the road segment, as long as it may ensure that the number of the existing public transport vehicle corresponding to the road segment is in inverse ratio to the priority corresponding to the road segment.

S406: determining identifier of an existing public transport vehicle corresponding to each road segment in a combined road segment based on the identifier of the existing public transport vehicle corresponding to each road segment.

S407: determining the number of first public transport vehicle corresponding to the combined road segment based on the identifier of the existing public transport vehicle corresponding to each road segment in the combined road segment, where the first public transport vehicle is an existing public transport vehicle corresponding to all road segments in the combined road segment.

As described below for S406 and S407 together, it may be determined based on the above description that at least one combined road segment may be determined based on a plurality of road segments in the first area in the present embodiment, where each road segment corresponds to its own identifier of the existing public transport vehicle, and then the identifier of the existing public transport vehicle corresponding to each road segment in the combined road segment may be determined.

For example, it may be understood in combination with FIG. 6 and FIG. 7 that, assuming that a combined road segment 1 is obtained by currently taking Kaichuang Avenue and Kaiyuan Avenue as a combined road segment, then the identifiers of the existing public vehicles corresponding to each of the two road segments in the combined road segment 1 may be determined.

Hereafter, the number of the first public transport vehicle corresponding to the combined road segment may be determined based on the identifier of the existing public transport vehicle corresponding to each road segment in the combined road segment, where the first public transport vehicle is an existing public transport vehicle corresponding to all road segments in the combined road segment.

Where the first public transport vehicle is in fact the public transport vehicle common to road segments in the combined road segment, for example, this may be understood by continuing to use the above example and in combination with FIG. 6 and FIG. 7. For example, for the combined road segment 1 (Kaichuang Avenue and Kaiyuan Avenue), based on FIG. 6 and FIG. 7, it may be understood that the public transport vehicles identified as 365, 371, 371A exist on both Kaichuang Avenue and Kaiyuan Avenue, and thus it may be determined that the public transport vehicles 365, 371, and 371A are the first public transport vehicles corresponding to the combined road segment 1.

For the remaining various possible combined road segments, the implementation of determining the first public transport vehicle is in a similar manner, and is not repeated here.

S408: determining a priority corresponding to the combined road segment based on the number of the first public transport vehicle corresponding to the combined road segments.

It is understood that the first public transport vehicle is a public transport vehicle that is present in each road segment of the combined road segment, then the larger the number of the first public transport vehicle, the more comprehensive the public transport coverage of the current combined road segment. In an possible implementation, if the number of the first public transport vehicle is 0, it means that there is no through public transport vehicle in this combined road segment, and then it is more necessary to plan the public transport route, so the number of the first public transport vehicle corresponding to the combined road segment and the priority of the combined road segment are actually inversely proportional to each other.

The higher the number of the first public transport vehicle corresponding to the combined road segment, the lower the priority corresponding to the combined road segment, and correspondingly, the lower the number of the first public transport vehicle corresponding to the combined road segment, the higher the priority corresponding to the combined road segment.

In a possible implementation of determining the priority corresponding to the combined road segment, it may be, for example, that if the number of the first public transport vehicle corresponding to the combined road segment is M, the priority corresponding to the combined road segment is determined to be T-M, where M is an integer greater than or equal to 0, and T is a preset positive integer.

For example, T may be preset to 10, and assuming that the number of the first public transport vehicle corresponding to current combined road segment 1 is 3, then the priority corresponding to the combined road segment 1 is 7; then assuming that there is currently existed a combined road segment 2, and with no the same public transport vehicle exists between road segments in the combined road segment 2, then it may be determined that the number of the first public transport vehicle corresponding to the combined road segment 2 is 0, then it may be determined that the priority corresponding to the combination road section 2 is 10. It can be seen that the number of the first public transport vehicle of the combined road segment 2 is smaller, and correspondingly the priority corresponding to the combined road segment 2 is higher. In an actual implementation, the specific setting of T may be selected based on an actual need, and is not limited in the present embodiment.

In another possible implementation, there may also be set, for example, a second preset function, where the second preset function may indicate an inverse relationship between the number of the first public transport vehicle corresponding to the combined road segment and the priority corresponding to the combined road segment. For example, the number of the first public transport vehicle corresponding to the combined road segment may be input into the second preset function, so as to obtain the priority corresponding to the combined road segment output by the second preset function. The present embodiment does not limit the specific implementation of determining the priority corresponding to the combined road segment, as long as it may ensure that the number of the first public transport vehicle corresponding to the combined road segment is in inverse ratio to the priority corresponding to the combined road segment.

S409: determining a first route among the plurality of road segments based on the priority corresponding to each road segment, and the priority corresponding to each combined road segment.

After determining the priority corresponding to each road segment, and the priority corresponding to each combined road segment, the first route among the plurality of road segments may be determined based on the priority information of these two parts.

In a possible implementation, if there is a first combined road segment with a priority of being T among the plurality of combined road segments, then it is determined that the first route includes the first combined road segment.

Where, if the priority corresponding to a certain combined road segment is T, which means that the number M of first public transport vehicle corresponding to the combined road segments is 0, then it is determined that there is no through public transport vehicle in the combined road segment, and therefore the priority of the combined road segment is high, and taking the coverage of public transport into account, it is determined that the first combined road segment is included in the first route;

or, if there is a first road segment with priority L among the plurality of road segments, it is determined that the first route includes the first road segment, in which, if the priority corresponding to a certain road segment is L, which means that the number N of the existing public transport vehicle in the road segment is 0, then it is determined that there is no public transport vehicle in the road segment, and therefore the road segment will have a high priority, and similarly, it is determined that the first road segment is included in the first route taking the coverage of public transport into account;

or, determining the first route may include: the combined road segment with the highest priority among the plurality of combined road segments and/or the road segment with the highest priority among the plurality of road segments.

That is, the combined road segment with the highest priority and the road segment with the highest priority are determined, and then the first route is determined, and it is possible to include in the first route only the combined road segment with the highest priority, or include in the first route only the road segment with the highest priority, or include in the first route both the combined road segment with the highest priority and the road segment with the highest priority in the first route. The specific implementation of the above may be selected based on an actual need, but it is worth stating that for road segments included in the determined first route, it is necessary to ensure that the road segments form a continuous route.

In an actual implementation, after determining that the first route includes the combined road segment with the highest priority or the road segment with the highest priority, as introduced above, the first route also includes some other road segments, the other road segments, for example, may be also road segments with high priority, or road segments consecutive to the determined road segments, etc. The present embodiment has no limit on this, as long as it can be ensured that the first route may include a corresponding road segments in each situation described above, and each road segment may form a continuous route. Other possible implementations may be selected based on an actual need.

Alternatively, in another possible implementation, a preset function may be provided, and is used, for example, to perform processing based on the priority of each road segment and the priority of each combined road segment and output the first route.

The specific implementation for determining the first route may be selected and extended based on an actual need, and it is not limited in the present embodiment, as long as the first route is determined based on the priority of the route and the priority of the combined route.

For example, in the example of FIG. 6, assuming that the first route may be currently determined, and the road segments included in the first route are: Suinan Road, Yunfeng Road, Kaiyuan Avenue, Ruihe Road, Lihong Second Road, Kaichuang Avenue, Xiangxue Eight Road, Xiangxue Avenue, and Kai Luo Avenue, which form routes for shuttle buses with the Xiangxue subway station as the center. This is only an exemplary illustration, and the specific implementation of the first route may be determined based on the implementation described above, and is not limited here.

S410: determining at least one sub-area in the first area.

In the present embodiment, at least one sub-area may be determined in the first area, where the sub-area may be, for example, a community, a shopping mall, a school, a hospital, etc. in the first area. For example, a point of interest in the first area may be used as a sub-area.

In a possible implementation, points of interest for the community, shopping mall, school, hospital, and the like included in the first area can be obtained in the map so as to determine at least one sub-area.

For example, it may be understood with reference to FIG. 8, and as shown in FIG. 8, for example, the first area near the Xiangxue subway station is currently determined. For example, one office area, one commercial center, five communities, and one park green area shown in FIG. 8 may be determined in the first area, and these may be used as sub-areas. In an actual implementation, the specific determination of the sub-areas may be selected based on an actual need, and is not limited in the present embodiment.

S411: determining at least one first stopping location in the first route based on a location of the sub-area.

After determining the sub-area, at least one first stopping location may be determined in the first route based on the location of the sub-area, where the first stopping location is used for the public transport vehicle to make a stop, and it is understood that the currently set first stopping location is actually a stop in the first route.

In a possible implementation, for example, a position close to a front side of a point locations of each sub-area and located on the first route may be determined as a stopping location, so as to facilitate boarding and alighting of passengers. For example, for a community, a stop may be set in a front side position of the community, thereby facilitating the stopping of vehicles and the boarding and alighting of passengers, but it is necessary to ensure that the first stopping location is located on the first route.

In an actual implementation, as long as the first stopping location set for each sub-area is close to the location of the sub-area, the specific choice of the first stopping location may be determined based on an actual need, and is not limited in the present embodiment.

S412: determining at least one second stopping location among the existing stopping location based on the at least one first stopping location.

After determining the at least one first stopping location, the first stopping location may serve as a stop corresponding to each sub-area in the first area, but the distribution of the sub-areas may not be uniform, so that determining only the first stopping location does not ensure comprehensive coverage of the stops on the first route, so that at least one second stopping location may also be determined among the existing stopping locations based on the first stopping location.

It is understood that because there are already some public traffic routes distributed on each segment of the first route, there are existing stopping locations on the first route, for example, existing bus stops, and then at least one second stopping location may be determined among these existing stopping locations.

In a possible implementation, when determining at least one second stopping location from the existing stopping locations, for example, an existing stopping location that makes the distribution of stops on the first route relatively uniform may be selected. For example it is possible to obtain the existing stopping locations between first stopping locations and then select an existing stopping location that makes the distribution of stops relatively uniform, so as to determine at least one second stopping location.

When there is a plurality of adjacent existing stopping locations to be selected, for example, a bus stop with a harbor may be selected preferentially as the second stopping location. The present embodiment does not limit the specific implementation of determining the second stopping location, as long as the second stopping location may be located on the first route, and the second stopping location and the first stopping location may jointly make the distribution of stops relatively uniform.

S413: determining a plurality of stopping locations including at least one first stopping location and at least one second stopping location.

After determining the first stopping location and the second stopping location, it is possible to determine the plurality of stopping locations including at least one first stopping location and at least one second stopping location, so as to achieve the determination of the stops on the first route.

In a possible implementation, assuming that the above example continues to be used, for example, the currently determined first route includes: Suinan Road, Yunfeng Road, Kaiyuan Avenue, Ruihe Road, Lihong Second Road, Kaichuang Avenue, Xiangxue Eight Road, Xiangxue Avenue, and Kailuo Avenue, then the determined plurality of stopping locations may include, for example, Lingnan Yazhu, Zhonghai Yucheng, Innovation Park, Chunshuli, Donghui City South, Donghui City, Wanhui Commercial, Plaza, Xiangxue City, Xiangxue Subway, Luogang Aoyuan Plaza, Guangzhou International Talent City, Xiangxue Subway, all of which are stops on this first route.

S414: generating a target public transport route based on the first route and the plurality of stopping locations.

After determining the first route and the plurality of stopping locations, the determination of a specific path and the determination of stops of a public transport route is achieved, so as to generate the target public transport route.

In a possible implementation, for the example used above, the target public transport route currently determined may include information as follows:

setting of stops in the route:

Upline: Lingnan Yazhu—Zhonghai Yucheng—Innovation Park—Chunshuli—Donghui City South—Donghui City—Wanhui Commercial Plaza—Xiangxue City—Xiangxue Subway—Luogang Aoyuan Plaza—Guangzhou International Talent City—Xiangxue Subway.

Downline: Xiangxue Subway—Xiangxue City—Wanhui Commercial Plaza—Donghui City—Donghui City South—Chunshuli—Innovation Park—Zhonghai Yucheng—Lingnan Yazhu.

Capacity and Frequency: 10 vehicles (9 on line, 1 expedient), departure interval: 7:00-9:00, 17:00-19:00, at 10-minutes intervals; 9:00-17:00, at 20-minutes intervals; 20-minutes intervals on weekends.

Bus routes with overlap of road segments: 327A Road; 365 Road; 367 Road; 371A Road; 371 Road; 373 Road; 506 Road; 516 Road; 566A Road; 571A Road; 942 Road; 948 Road; and B31 Road.

Name of road segments in the first route: Suinan Road, Yunfeng Road, Kaiyuan Avenue, Ruihe Road, Lihong Second Road, Kaichuang Avenue, Xiangxue Eight Road, Xiangxue Avenue, Kailuo Avenue.

Types of road segments: Suinan Road, one-way and 2 lanes; Yunfeng Road, one-way and 2 lanes; Kaiyuan Avenue, one-way and 3-4 lanes; Ruihe Road, one-way and 3 lanes; Lihong Second Road, one-way and 3 lanes; Kaichuang Avenue, one-way and 4 lanes; Xiangxue Eighth Road, one-way and 2 lanes; Xiangxue Avenue, one-way and 2 lanes; and Kailuo Avenue, one-way and 2 lanes.

Based on the contents introduced above, three elements of route planning may be introduced here, and the three elements are point, line, and plane.

Among them, the point mainly refers to the determination of a stop, the point may be classified based on a bus stop and a non-bus stop, the non-bus stop may include, for example, a community entrance, an office building, a garden entrance, and a park entrance. A requirement of point selection for the classification of these points may be, for example, that for the bus stop, it is preferential to select a bus stops with a harbor, and for the non-bus stop, it is preferential to select a position of the front side of the points locations.

As well, the line mainly refers to the determination of the first route, and in the determination of the route, for example, the roads that are passable for the public transport means may be determined based on such as width, height, traffic restriction and road order of each road, and in the specific selection of the first route, the OD route covering a vacant direction and a blank area not accessible by public transport are selected preferentially.

As well, the plane mainly refers to the determination of the vehicle operation plan, and when determining the plane, for example, for a community, an O-peak time is in the morning and a D-peak time in the evening; for an office building, an O-peak time is in the evening and a D-peak time in the morning; for a commercial center, a middle of the OD time area is off-peak periods, and weekends and holidays; for a park green area, a middle of the OD time area is off-peak periods, weekends and holidays; where the O-peak for example may be understood as the peak for getting out, D peak may be understood as the peak for returning, that is, they correspond to different directions of route traffic. Based on the peak time information of these different areas, numbers of buses, intervals, the number of vehicles, etc. may be determined, that is, the "Capacity and Frequency" described above is determined.

In an actual implementation, the specific implementation of the target public transport route determined finally may be selected based on an actual need, and is not limited in the present embodiment.

S415: plotting and displaying the target public transport route in the map; or, sending the target public transport route to a preset device.

After determining the target public transport route, the target public transport route may be drawn and displayed directly in the map, for example, to facilitate an intuitive and quick determination of the target public transport route currently determined; or, the target public transport route may be sent to the preset device, which may also quickly determine the target public transport route currently determined.

The method for determining a public transport route provided by the embodiment of the present disclosure involves determining a priority of a road segment based on the number of public transport vehicles on the road segment, and a priority of the combined road segment based on the number of public transport vehicles coexisting in road segments in the combined road segment, and then jointly determining the first route by combining the priority of road segments with the priority of the combined road segment. In this way, it is effectively ensured that the first route may preferentially cover the area lacking public transport, thereby effectively improving the rationality of the determined public transport route. Furthermore, the stops for the first route are specifically determined based on each sub-area in the first route and the existing stops, thereby effectively ensuring the rationality of the determination of stops.

Figure 9:
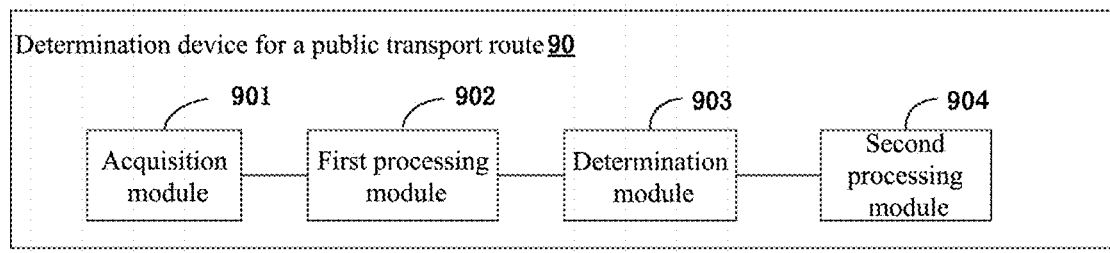
FIG. 9 is a schematic structural diagram of an apparatus for determining a public transport route according to an embodiment of the present disclosure.

FIG. 9 is a schematic diagram of a structure of a determination device for a public transport route of an embodiment of the present disclosure. As shown in FIG. 9, the determination device 900 of the public transport route of the present embodiment may include: an acquisition module 901, a first processing module 902, a determination module 903, and a second processing module 904.

The acquisition module 901 is configured to acquire a route planning request, where the route planning request is used to request for planning a public transport route within a first area;

the first processing module 902 is configured to identify in a map a plurality of road segments included in the first area and acquiring in a preset database identifier of the existing public transport vehicle corresponding to each road segment;

the determination module 903 is configured to determine a first route among the plurality of road segments based on the identifier of the existing public transport vehicle corresponding to each road segment, where the first route includes at least one road segment, there is no identical public transport vehicle in the at least one road segment, or the number of the existing public transport vehicle corresponding to some of the road segments in the first route is smaller than or equal to a first threshold value; and the second processing module 904 is configured to determine a plurality of stopping locations in the first route, generating a target public transport route based on the first route and the plurality of stopping locations, and outputting the target public transport route.

In a possible implementation, the determination module 903 is specifically configured to:

perform a combination treatment on at least two adjacent road segments among the plurality of road segments, to obtain a plurality of combined road segments;

determine a priority corresponding to each road segment and a priority corresponding to each combined road segment, based on the identifier of the existing public transport vehicle corresponding to each road segment; and determine a first route among the plurality of road segments based on the priority corresponding to each road segment and the priority corresponding to each combined road segment.

In a possible implementation, the determination module 903 is specifically configured to:

determine the number of the existing public transport vehicle corresponding to each road segment based on the identifier of the existing public transport vehicle corresponding to each road segment; and determine a priority corresponding to each road segment based on the number of the existing public transport vehicle corresponding to each road segment.

In a possible implementation, the determination module 903 is specifically configured to:

determine the priority corresponding to a road segment as L-N if the number of the existing public transport vehicle corresponding to the road segment is N, where the N is an integer greater than or equal to 0, and the L is a preset positive integer.

In a possible implementation, the determination module 903 is specifically configured to:

determine the identifier of the existing public transport vehicle corresponding to each road segment in the combined road segment based on the identifier of the existing public transport vehicle corresponding to each road segment;

determine the number of a first public transport vehicle corresponding to the combined road segment based on the identifier of the existing public transport vehicle corresponding to each road segment in the combined road segment, where the first public transport vehicle is an existing public transport vehicle corresponding to all road segments in the combined road segment; and determine the priority corresponding to the combined road segment based on the number of the first public transport vehicle corresponding to the combined road segment.

In a possible implementation, the determination module 903 is specifically configured to:

determine the priority corresponding to the combined road segment as T-M if the number of the first public transport vehicle corresponding to the combined road segment is M, where the M is an integer greater than or equal to 0, and the T is a preset positive integer.

In a possible implementation, the determination module 903 is specifically configured to:

if there is a first combined road segment with a priority of being T among the plurality of combined road segments, then determine that the first route includes the first combined road segment; or if there is a first road segment with a priority of being L among the plurality of road segments, then determine that the first route includes the first road segment; or determine that the first route includes: a combined road segment with a highest priority among the plurality of combined road segments and/or a road segment with a highest priority among the plurality of road segments.

In a possible implementation, the second processing module 904 is specifically configured to:

determine at least one sub-area in the first area; and determine a plurality of stopping locations in the first route based on a location of the sub-area and the existing stopping locations in the first route.

In a possible implementation, the second processing module 904 is specifically configured to:

determine at least one first stopping location in the first route based on the location of the sub-area;

determine at least one second stopping location among the existing stopping location based on the at least one first stopping location; and determine that the plurality of stopping locations include the at least one first stopping location and the at least one second stopping location.

In a possible implementation, the second processing module 904 is specifically configured to:

plot the target public transport route in a map and display the target public transport route; or send the target public transport route to a preset device.

The present disclosure provides a method and an apparatus for determining a public transport route, applied in the field of intelligent transportation in data processing technology, for the purpose of improving the comprehensive coverage of the determined public transport route.

According to embodiments of the present disclosure, the present disclosure further provides an electronic device and a readable storage medium.

According to embodiments of the present disclosure, the present disclosure further provides a computer program product, where the computer program product includes: a computer program stored in a readable storage medium, at least one processor of an electronic device may read the computer program from the readable storage medium, and the at least one processor executes the computer program to cause the electronic device to perform the solution provided by any one of the above embodiments.

FIG. 8 illustrates a schematic block diagram of an exemplarily electronic device 800 that may be used to implement embodiments of the present disclosure. The electronic device is intended to represent digital computers in various forms, such as, laptops, desktop computers, workstations, personal digital assistants, servers, blade servers, mainframe computers, and other suitable computers. The electronic device may also represent mobile apparatuses in various forms, such as, personal digital processing, cellular phones, smart phones, wearable devices, and other similar computing apparatuses. The components shown herein, their connections and relationships, and their functions are used as examples only, and are not intended to limit the implementations of the present disclosure described and/or claimed herein.

Figure 10:
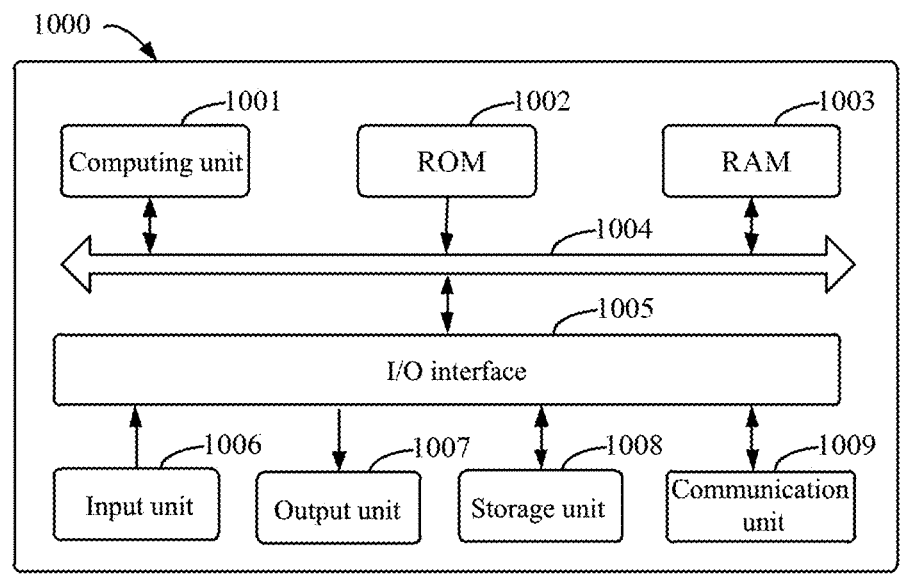
FIG. 10 is a block diagram of an electronic device to implement a method for determining a public transport route according to an embodiment of the present disclosure.

As shown in FIG. 10, the electronic device 1000 includes a computing unit 1001 that may perform various appropriate actions and processes based on a computer program stored in a read-only memory (ROM) 1002 or loaded into a random access memory (RAM) 1003 from a storage unit 1008. Various programs and data required for operation of the device 1000 may also be stored in RAM 1003. The computing unit 1001, ROM 1002, and RAM 1003 are connected to each other via a bus 1004. An input/output (I/O) interface 1005 is also connected to the bus 1004.

A plurality of components in the device 1000 are connected to the I/O interface 1005, and include: an input unit 1006, such as keyboards, mices, etc.; an output unit 1007, such as various types of displays, speakers, etc.; a storage unit 1008, such as magnetic disks, optical disks, etc.; and a communication unit 1009, such as network cards, modems, wireless communication transceivers, etc. The communication unit 1009 allows the device 1000 to exchange information/data with other devices via a computer network such as the Internet and/or various telecommunication networks.

The computing unit 1001 may be a variety of general and/or special processing components with processing and computing capabilities. Some examples of the computing unit 1001 include, but are not limited to, central processing units (CPUs), graphics processing units (GPUs), various special artificial intelligence (AI) computing chips, various computing units running machine learning model algorithms, digital signal processors (DSPs), and any appropriate processors, controllers, micro-controllers, etc. The computing unit 1001 performs the methods and processes described above, such as method for determining a public transport route. For example, in some embodiments, the method for determining the public transport route may be implemented as a computer software program that is tangibly included in a machine-readable medium, such as the memory unit 1008. In some embodiments, some or all of the computer program may be loaded into and/or installed onto the device 1000 via the ROM 1002 and/or the communication unit 1009. When the computer program is loaded into RAM 1003 and executed by the computing unit 1001, one or more steps of the method for determining a public transport route described above may be performed. Alternatively, in other embodiments, the computing unit 1001 may be configured to perform the method for determining a public transport route by any other appropriate mode (e.g., with the aid of firmware).

Various implementations of the systems and techniques described above herein may be achieved in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software, and/or combinations of them. These various implementations may include: implementing in one or more computer programs that may be executed and/or interpreted on a programmable system including at least one programmable processor, the programmable processor may be a special or general programmable processor that may receive data and instructions from a storage system, at least one input apparatus, and at least one output apparatus, and transmit the data and instructions to the storage system, the at least one input apparatus, and the at least one output apparatus.

The program codes for implementing the methods of the present disclosure may be written in any combination of one or more programming languages. These program codes may be provided to a processor or controller of a general computer, a special computer, or other programmable data processing device such that the program codes, when executed by the processor or controller, causes the functions/operations specified in the flowchart and/or block diagram to be implemented. The program codes may be executed entirely on a machine, partially on a machine, or partially on a machine as an independent software package and partially on a remote machine, or entirely on a remote machine or server.

In the context of the present disclosure, a machine-readable medium may be a tangible medium that may include or store a program for use by or in combination with an instruction-executing system, apparatus, or device. The machine-readable medium may be a machine-readable signal medium or a machine-readable storage medium. A machine-readable medium may include, but is not limited to, electronic, magnetic, optical, electromagnetic, infrared, or semiconductor systems, devices, or apparatus, or any suitable combination of the foregoing. More specific examples of the machine-readable storage media may include electrical connections based on one or more wires, portable computer disks, hard disks, random access memory (RAM), read-only memory (ROM), erasable programmable read-only memories (EPROMs or flash memory), optical fibers, convenient compact disk read-only memories (CD-ROMs), optical storage devices, magnetic storage devices, or any suitable combination of the foregoing.

To provide interaction with a user, the systems and techniques described herein may be implemented on a computer having: a display device (e.g., a CRT (cathode ray tube) or LCD (liquid crystal display) monitor) for displaying information to the user; and a keyboard and pointing apparatus (e.g., a mouse or trackball) through which the user may provide an input to the computer. Other types of devices may further be used to provide interaction with the user; for example, a feedback provided to the user may be any form of sensory feedback (e.g., visual feedback, auditory feedback, or haptic feedback); and the input from the user may be received in any form (including acoustic input, voice input, or haptic input).

The systems and techniques described herein may be implemented in a computing system including a back-end component (e.g., as a data server), or a computing system including a middleware component (e.g., an application server), or a computing system including a front-end component (e.g., a user computer having a graphical user interface or a web browser through which a user may interact with the implementation of the systems and techniques described herein), or a computing system including any combination of such back-end component, middleware component, or front-end component. The components of the system may be interconnected via any form or medium of digital data communication (e.g., a communication network). Examples of the communication network include local area networks (LANs), wide area networks (WANs), and the Internet.

A computer system may include a client and a server. The client and server are generally located away from each other and interact by a communication network. A relationship between the client and the server is generated by computer programs that run on corresponding computers and have a client-server relationship with each other. The server may be a cloud server, also known as a cloud computing server or cloud host, which is a host product in the cloud computing service system to solve the defects of difficult management and weak business scalability existed in the traditional physical host and VPS service ("Virtual Private Server", or "VPS" for short). The server may also be a server for a distributed system, or a server combined with a block-chain.

It should be understood that various forms of processes as shown above may be used to reorder, add, or remove steps. For example, the steps recited in the present application may be performed in parallel or sequentially or in a different order, as long as the desired results of the technical solutions disclosed by the present disclosure are achieved, and there is no limit on this herein.

The above specific embodiments do not constitute a limitation on the scope claimed by the present disclosure. It should be understood by those skilled in the art that various modifications, combinations, sub-combinations, and substitutions may be made based on design requirements and other factors. Any modifications, equivalent substitutions, and improvements, etc., made within the spirit and principles of the present disclosure shall be included within the protection scope of the present disclosure.

What is claimed is:

1. A method for determining a public transport route, comprising:
   acquiring a route planning request, where the route planning request is used to request for planning a public transport route within a first area;
   identifying a plurality of road segments included within the first area in a map and obtaining an identifier of an existing public transport vehicle corresponding to each road segment in a preset database;
   determining a first route among the plurality of road segments based on the identifier of the existing public transport vehicle corresponding to each road segment, where the first route includes at least one road segment, there is no identical public transport vehicle in the at least one road segment, or the number of an existing public transport vehicle corresponding to some of the road segments in the first route is smaller than or equal to a first threshold value; and
   determining a plurality of stopping locations in the first route, generating a target public transport route based on the first route and the plurality of stopping locations, and outputting the target public transport route.

2. The method according to claim 1, wherein determining the first route among the plurality of road segments based on the identifier of the existing public transport vehicle corresponding to each road segment comprises:
   performing a combination treatment on at least two adjacent road segments among the plurality of road segments to obtain a plurality of combined road segments;
   determining a priority corresponding to each road segment and a priority corresponding to each combined road segment based on the identifier of the existing public transport vehicle corresponding to each road segment; and
   determining the first route among the plurality of road segments based on the priority corresponding to each road segment and the priority corresponding to each combined road segment.

3. The method according to claim 2, wherein determining the priority corresponding to each road segment based on the identifier of the existing public transport vehicle corresponding to each road segment, comprises:
  determining the number of the existing public transport vehicle corresponding to each road segment based on the identifier of the existing public transport vehicle corresponding to each road segment; and
  determining the priority corresponding to each road segment based on the number of the existing public transport vehicle corresponding to each road segment.

4. The method according to claim 3, wherein, for any one road segment of the plurality of road segments, determining the priority corresponding to the road segment based on the number of the existing public transport vehicle corresponding to the road segment, comprises:
  if the number of the existing public transport vehicle corresponding to the road segment is N, determining the priority corresponding to the road segment as L-N, where N is an integer greater than or equal to 0, and L is a preset positive integer.

5. The method according to claim 2, wherein, for any one combined road segment of the plurality of combined road segments, determining the priority corresponding to the combined road segment based on the identifier of the existing public transport vehicle corresponding to each road segment, comprises:
  determining an identifier of an existing public transport vehicle corresponding to each road segment in the combined road segment based on the identifier of the existing public transport vehicle corresponding to each road segment;
  determining the number of a first public transport vehicle corresponding to the combined road segment based on the identifier of the existing public transport vehicle corresponding to each road segment in the combined road segment, where the first public transport vehicle is an existing public transport vehicle corresponding to all road segments in the combined road segment; and
  determining the priority corresponding to the combined road segment based on the number of the first public transport vehicle corresponding to the combined road segment.

6. The method according to claim 5, wherein determining the priority corresponding to the combined road segment based on the number of the first public transport vehicle corresponding to the combined road segment, comprises:
  if the number of first public transport vehicle corresponding to the combined road segment is M, determining the priority corresponding to the combined road segment as T-M, where M is an integer greater than or equal to 0, and T is a preset positive integer.

7. The method according to claim 2, wherein determining the first route among the plurality of road segments based on the priority corresponding to each road segment and the priority corresponding to each combined road segment, comprises:
  if there is a first combined road segment with a priority of being T among the plurality of combined road segments, determining that the first route comprises the first combined road segment; or
  if there is a first road segment with a priority of being L among the plurality of road segments, determining that the first route comprises the first road segment; or
  determining that the first route comprises: a combined road segment with a highest priority among the plurality of combined road segments and/or a road segment with a highest priority among the plurality of road segments.

8. The method according to claim 3, wherein determining the first route among the plurality of road segments based on the priority corresponding to each road segment and the priority corresponding to each combined road segment, comprises:
  if there is a first combined road segment with a priority of being T among the plurality of combined road segments, determining that the first route comprises the first combined road segment; or
  if there is a first road segment with a priority of being L among the plurality of road segments, determining that the first route comprises the first road segment; or
  determining that the first route comprises: a combined road segment with a highest priority among the plurality of combined road segments and/or a road segment with a highest priority among the plurality of road segments.

9. The method according to claim 4, wherein determining the first route among the plurality of road segments based on the priority corresponding to each road segment and the priority corresponding to each combined road segment, comprises:
  if there is a first combined road segment with a priority of being T among the plurality of combined road segments, determining that the first route comprises the first combined road segment; or
  if there is a first road segment with a priority of being L among the plurality of road segments, determining that the first route comprises the first road segment; or
  determining that the first route comprises: a combined road segment with a highest priority among the plurality of combined road segments and/or a road segment with a highest priority among the plurality of road segments.

10. The method according to claim 1, wherein determining the plurality of stopping locations in the first route comprises:
  determining at least one sub-area in the first area; and
  determining a plurality of stopping locations in the first route based on a location of the sub-area and an existing stopping location in the first route.

11. The method according to claim 10, wherein determining the plurality of stopping locations in the first route based on the location of the sub-area and the existing stopping location in the first route, comprises:
  determining at least one first stopping location in the first route based on the location of the sub-area;
  determining at least one second stopping location among the existing stopping location based on the at least one first stopping location; and
  determining that the plurality of stopping locations comprises the at least one first stopping location and the at least one second stopping location.

12. The method according to claim 1, wherein outputting the target public transport route comprises:
  plotting the target public transport route in a map and displaying the target public transport route; or
  sending the target public transport route to a preset device.

13. An apparatus for determining a public transport route, comprising:
  at least one processor; and
  a memory connected in communication with the at least one processor; wherein
  the memory stores instructions executable by the at least one processor, and the instructions are executed by the at least one processor to enable the at least one processor to:

acquire a route planning request, where the route planning request is used to request for planning a public transport route within a first area;
identify a plurality of road segments comprised in the first area in a map and acquiring an identifier of an existing public transport vehicle corresponding to each road segment in a preset database;
determine a first route among the plurality of road segments based on the identifier of the existing public transport vehicle corresponding to each road segment, where the first route comprises at least one road segment, there is no identical public transport vehicle in the at least one road segment, or, the number of an existing public transport vehicle corresponding to some of the road segments in the first route is smaller than or equal to a first threshold value; and
determine a plurality of stopping locations in the first route, generating a target public transport route based on the first route and the plurality of stopping locations, and outputting the target public transport route.

14. The apparatus according to claim 13, wherein the at least one processor is enabled to:
perform a combination treatment on at least two adjacent road segments among the plurality of road segments to obtain a plurality of combined road segments;
determine a priority corresponding to each road segment and a priority corresponding to each combined road segment based on the identifier of the existing public transport vehicle corresponding to each road segment; and
determine a first route among the plurality of road segments based on the priority corresponding to each road segment and the priority corresponding to each combined road segment.

15. The apparatus according to claim 14, wherein the at least one processor is enabled to:
determine the number of the existing public transport vehicle corresponding to each road segment based on the identifier of the existing public transport vehicle corresponding to each road segment; and
determine the priority corresponding to each road segment based on the number of the existing public transport vehicle corresponding to each road segment.

16. The apparatus according to claim 15, wherein the at least one processor is enabled to:
if the number of the existing public transport vehicle corresponding to a road segment is N, determine the priority corresponding to the road segment as L-N, where N is an integer greater than or equal to 0, and L is a preset positive integer.

17. The apparatus according to claim 14, wherein the at least one processor is enabled to:
determine an identifier of an existing public transport vehicle corresponding to each road segment in the combined road segment based on the identifier of the existing public transport vehicle corresponding to each road segment;
determine the number of a first public transport vehicle corresponding to the combined road segment based on the identifier of the existing public transport vehicle corresponding to each road segment in the combined road segment, where the first public transport vehicle is an existing public transport vehicle corresponding to all road segment in the combined road segment; and
determine the priority corresponding to the combined road segment based on the number of the first public transport vehicle corresponding to the combined road segment.

18. The apparatus according to claim 17, wherein the at least one processor is enabled to:
if the number of the first public transport vehicle corresponding to the combined road segment is M, determine the priority corresponding to the combined road segment as T-M, where M is an integer greater than or equal to 0, and T is a preset positive integer.

19. The apparatus according to claim 14, wherein the at least one processor is enabled to:
if there is a first combined road segment with a priority of being T among the plurality of combined road segments, determine that the first route comprises the first combined road segment; or
if there is a first road segment with a priority of being L among the plurality of road segments, determine that the first route comprises the first road segment; or
determine that the first route comprises: a combined road segment with a highest priority among the plurality of combined road segments and/or a road segment with a highest priority among the plurality of road segments.

20. A non-transitory computer-readable storage medium, having computer instructions stored therein, wherein the computer instructions are used to enable a computer to:
acquire a route planning request, where the route planning request is used to request for planning a public transport route within a first area;
identify a plurality of road segments included within the first area in a map and obtain an identifier of an existing public transport vehicle corresponding to each road segment in a preset database;
determine a first route among the plurality of road segments based on the identifier of the existing public transport vehicle corresponding to each road segment, where the first route includes at least one road segment, there is no identical public transport vehicle in the at least one road segment, or the number of an existing public transport vehicle corresponding to some of the road segments in the first route is smaller than or equal to a first threshold value; and
determine a plurality of stopping locations in the first route, generate a target public transport route based on the first route and the plurality of stopping locations, and output the target public transport route.

* * * * *